US011477069B2

(12) United States Patent
Erkan et al.

(10) Patent No.: US 11,477,069 B2
(45) Date of Patent: Oct. 18, 2022

(54) INSERTING REPLAY EVENTS IN NETWORK PRODUCTION FLOWS

(71) Applicant: AT&T Intellectual Property I, L.P., Atlanta, GA (US)

(72) Inventors: Ben Hasan Erkan, Bloomfield Township, NJ (US); Robert D. Boudreau, Jr., North Wales, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/106,175

(22) Filed: Nov. 29, 2020

(65) Prior Publication Data

US 2022/0173959 A1   Jun. 2, 2022

(51) Int. Cl.
| | |
|---|---|
| *H04L 41/0631* | (2022.01) |
| *H04L 41/069* | (2022.01) |
| *H04L 41/5074* | (2022.01) |
| *H04L 43/55* | (2022.01) |
| *H04L 41/0213* | (2022.01) |

(52) U.S. Cl.
CPC ........ *H04L 41/0631* (2013.01); *H04L 41/069* (2013.01); *H04L 41/5074* (2013.01); *H04L 43/55* (2022.05); *H04L 41/0213* (2013.01)

(58) Field of Classification Search
CPC ............... H04L 41/0631; H04L 41/069; H04L 41/5038; H04L 41/5074; H04L 41/0213
See application file for complete search history.

(56) References Cited

U.S. PATENT DOCUMENTS

| | | | | |
|---|---|---|---|---|
| 2013/0227103 | A1* | 8/2013 | Garimella | H04L 41/5054 709/223 |
| 2015/0297949 | A1* | 10/2015 | Aman | G06T 7/246 348/157 |
| 2015/0347751 | A1* | 12/2015 | Card | H04L 63/20 726/23 |
| 2017/0353519 | A1* | 12/2017 | McLeod | H04L 65/604 |
| 2019/0306010 | A1* | 10/2019 | Medam | G06F 16/23 |

* cited by examiner

*Primary Examiner* — Joseph L Greene

(57) ABSTRACT

An example method includes detecting a first replay event in a production flow being processed by a service assurance platform of a telecommunications service provider network, where the production flow comprises a stream of production events and a stream of replay events including at least the first replay event, processing the first replay event to generate a ticket for the first replay event, and delivering the ticket to a database that stores a plurality of tickets generated for a plurality of replay events.

20 Claims, 5 Drawing Sheets

INSERTING REPLAY EVENTS IN NETWORK PRODUCTION FLOWS

The present disclosure relates generally to the testing and validation of complex event flows, and relates more particularly to devices, non-transitory computer-readable media, and methods for inserting replay events into production flows.

BACKGROUND

Service assurance (SA) is a term used to describe the application of policies and processes by a telecommunications service provider to ensure that services offered to customers over a telecommunications service provider network meet a pre-defined service quality level. One aspect of SA involves issue tracking, or detecting and resolving events in the network that are indicative of the service failing to meet the pre-defined service quality level or service degrading. When such an event is detected, a ticketing system of an SA platform may generate a ticket for review by a technician. The ticket may include information about the detected event that can help the technician to diagnose the cause of the event and to perform some remedial action.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
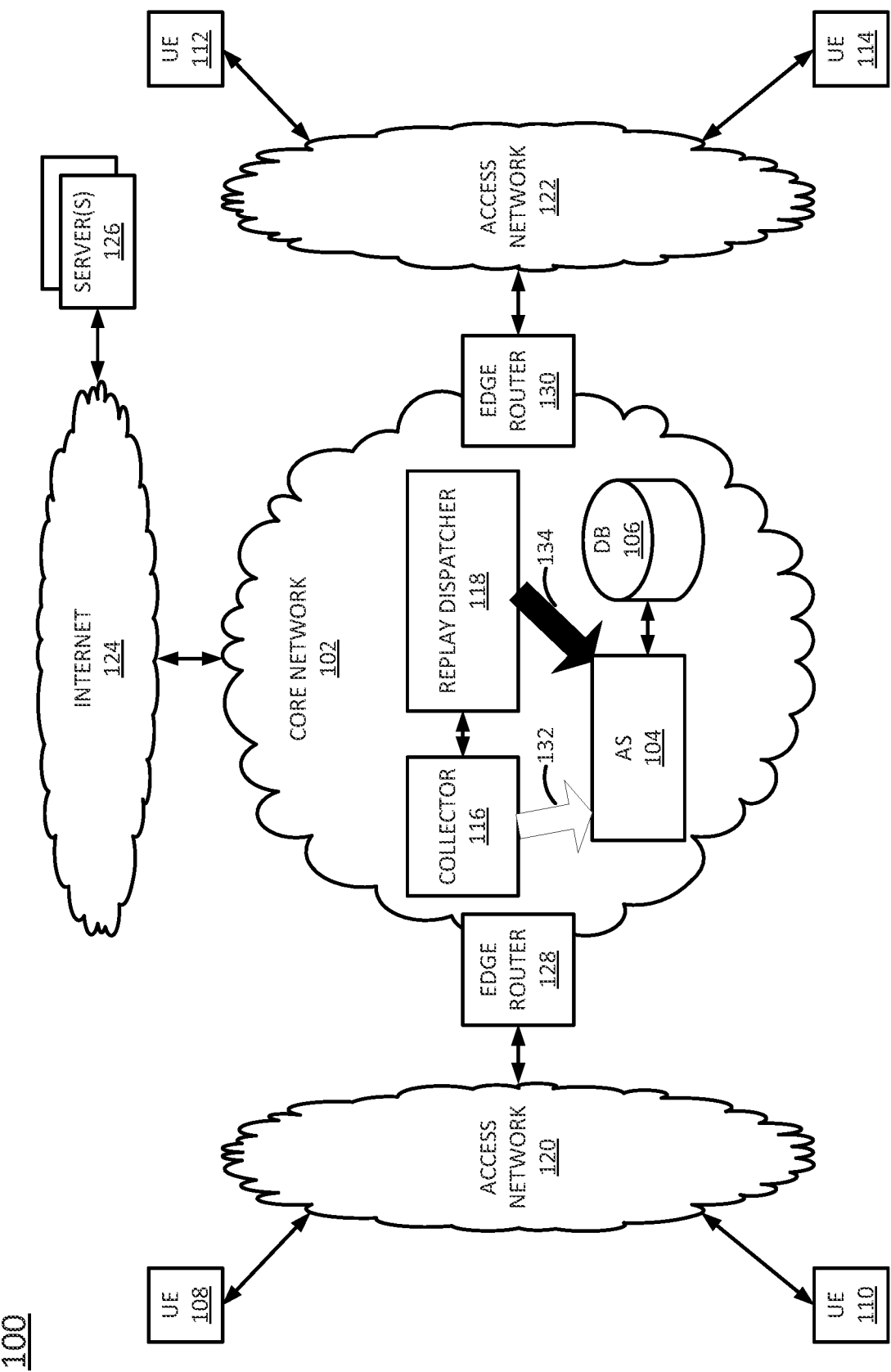
FIG. 1 illustrates an example system in which examples of the present disclosure for inserting replay events into production flows may operate.

The present disclosure broadly discloses methods, computer-readable media, and systems for inserting replay events into production flows. In one example, a method performed by a processing system includes detecting a first replay event in a production flow being processed by a service assurance platform of a telecommunications service provider network, where the production flow comprises a stream of production events and a stream of replay events including at least the first replay event, processing the first replay event to generate a ticket for the first replay event, and delivering the ticket to a database that stores a plurality of tickets generated for a plurality of replay events.

In another example, a non-transitory computer-readable medium may store instructions which, when executed by a processing system in a communications network, cause the processing system to perform operations. The operations may include detecting a first replay event in a production flow being processed by a service assurance platform of a telecommunications service provider network, where the production flow comprises a stream of production events and a stream of replay events including at least the first replay event, processing the first replay event to generate a ticket for the first replay event, and delivering the ticket to a database that stores a plurality of tickets generated for a plurality of replay events.

In another example, a system may include a processing system including at least one processor and a non-transitory computer-readable medium storing instructions which, when executed by the processing system when deployed in a communications network, cause the processing system to perform operations. The operations may include detecting a first replay event in a production flow being processed by a service assurance platform of a telecommunications service provider network, where the production flow comprises a stream of production events and a stream of replay events including at least the first replay event, processing the first replay event to generate a ticket for the first replay event, and delivering the ticket to a database that stores a plurality of tickets generated for a plurality of replay events.

As discussed above, one aspect of service assurance (SA) involves issue tracking, or detecting and resolving events in a telecommunications service provider network that are indicative of a service failing to meet a pre-defined service quality level. When such an event is detected, a ticketing system of an SA platform may generate a ticket for review by a technician. The testing and validation of complex event flows in systems such as a ticketing system, or any other systems of an SA or similar platform, often involve "replaying" events into the system when testing a new or modified policy. For instance, conventional testing and validation techniques may create a second flow (e.g., a "replay flow"), separate from the production flow (where the production flow comprises a real time flow of new events), in which replay events can be inserted and policies can be modified to measure the effects of the modified policies without disrupting the ongoing production flow.

"Replay events," within the context of the present disclosure, are historical production events that have been observed and captured by the system in a raw or original format, such that when a replay event is inserted back into an event flow, the system treats the replay event as if the replay event is an autonomous event, except for one difference. The difference is that the replay event contains metadata (e.g., in the form of a replay header or flag) that contains some attributes used by the replay functionality to track the replay event as it traverses the SA platform.

Examples of the present disclosure provide the option to insert replay events into either a dedicated replay flow or a production flow for end-to-end testing and validation of an SA platform system. The production flow is connected to downstream systems in the production environment (e.g., the production environment may be an SA platform, and the downstream systems may include a ticketing system). Replay events can be inserted into the production flow or the replay flow at various points in the production flow and the replay flow. As discussed above, when the replay events are inserted into the production flow, metadata associated with the replay events is used to ensure proper handling of the replay events by components of the SA platform.

Key attributes contained in the metadata of a replay event may include, but are not limited to, attributes such as a unique identifier that identifies a specific job associated with the replay event, a time stamp indicating a time at which the original production event (of which the replay event is a duplicate) was observed in the production flow, and a flow indicator identifying an event flow to which the replay event belongs (e.g., a production flow or a replay flow). The flow indicator is typically used when inserting a replay event into a production flow. Since replay events can be inserted into both the production flow and the replay flow (depending on replay entry point), the flow indicator is leveraged by both the production flow and the replay flow such that, when a replay event is replayed into the replay flow, the production flow drops or ignores the replay event (and vice versa). These and other aspects of the present disclosure are discussed in greater detail below in connection with the examples of FIGS. 1-6.

Although examples of the present disclosure are described within the context of a service assurance platform, it will be appreciated that the techniques described herein could be used to test and validate policies for any type of platform or system in which it may be helpful to replay historical events as part of the testing and validation process.

To further aid in understanding the present disclosure, FIG. 1 illustrates an example system 100 in which examples of the present disclosure for inserting replay events into production flows may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, a production events collector (or, simply, "collector") 116, a replay dispatcher 118, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider. The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth.

In one example, each of the user endpoint devices 108, 110, 112, and 114 may comprise any single device or combination of devices that may comprise a user endpoint device. For example, the user endpoint devices 108, 110, 112, and 114 may each comprise a mobile device, a cellular smart phone, a gaming console, a set top box, a laptop computer, a tablet computer, a desktop computer, an Internet of Things (IoT) device, a wearable smart device (e.g., a smart watch, a fitness tracker, a head mounted display, or Internet-connected glasses), an application server, a bank or cluster of such devices, and the like. To this end, the user endpoint devices 108, 110, 112, and 114 may comprise one or more physical devices, e.g., one or more computing systems or servers, such as computing system 600 depicted in FIG. 6, and may be configured as described below. At least one of the user endpoint devices 108, 110, 112, and 114 may comprise a computing device operated by a human technician or a policy writer of an SA platform of the telecommunications service provider network, where the at least one user endpoint device may be used to control testing and validation of policies associated with the SA platform as discussed in further detail below.

In one example, one or more servers 126 may be accessible to user endpoint devices 108, 110, 112, and 114 via Internet 124 in general. The server(s) 126 may operate in a manner similar to the AS 104, which is described in further detail below. Alternatively, the servers may comprise application servers accessible by the user endpoint devices 108, 110, 112, and 114 that provide one or more services (e.g., media streaming servers, web servers, etc.).

In one example, the collector 116, the replay dispatcher 118, and the AS 104 may collectively comprise a system that is provided by an operator of the core network 102 (e.g., a telecommunication service provider) as part of a service assurance platform. For instance, in one example, the AS 104 may comprise an issue tracking system that processes production events collected by the collector 116 and replay events provided by the replay dispatcher 118.

More specifically, the collector 116 may detect and collect information about events that occur in the system 100 that may be indicative of a degradation in the service provided to user endpoint devices 108, 110, 112, and 114. These fault/ performance events may take the form of simple network management protocol (SNMP) events, system logging protocol (syslog) events, polling events, streaming telemetry events, and other types of fault events. In one example, the events collected by the collector 116 may be collected in one or more machine-readable forms that are not readable by a human technician (i.e., not readable without some further processing). In one example, events collected by the collector 116 may also be referred to herein as "production events." A production event is an original event that occurs in a production environment (as opposed to a "replay event," which is discussed in greater detail below).

In one example, an SNMP event may comprise a fault or performance event (also referred to as a "trap") sent by a managed device (e.g., one of the user endpoint devices 108, 110, 112, and 114 or a network device such as edge routers 128 and 130, servers 126, and the like) when a change-of-state (COS) event occurs. The COS event may comprise, for example, a power outage, a security breach, a simple status event (e.g., a door opening and closing, etc.), and other events indicating a change-of-status. SNMP events may be sent by the managed devices according to a regular schedule (e.g., updates sent every x minutes) or automatically in response to a COS event being detected.

In one example, a syslog event may comprise a message generated by a network device, such as a router or switch (e.g., edge routers 128 and 130, servers 126, etc.), to record an event observed by the network device. For instance, a syslog event associated with a router might comprise a user logging on to a console session, while a syslog event associated with a web server might comprise an access-denied event.

In one example, a polling event may be detected by a poller upon a failure of a network device, such as a router, a switch, or a server (e.g., edge routers 128 and 130, servers 126, etc.) or network interface cards or protocols (e.g., border gateway protocol) configured on those network devices, to respond to a polling message. In this case, the polling message may comprise a message sent to the network device to confirm that the network device's readiness or state. The failure to respond may indicate a network device failure or a card or interface protocol failure on the network device.

In one example, a streaming telemetry event may comprise status data (e.g., up or down) that is reported by a network device, such as a router or switch (e.g., edge routers 128 and 130, servers 126, etc.) or other devices in an automatic continuous manner (i.e., without the need for polling). For instance, a streaming telemetry event might comprise a report of real time packet drops or utilization on network links. It is noted that SNMP, syslog, and streaming telemetry type events may all report the same of similar types of failures. Which type of event reports a failure is dependent upon vendor implementations. For instance, a device vendor may configure certain types of failures (e.g., device, card, interface, protocol, environmental failure, etc.) to be reported using certain types of events (e.g., SNMP, syslog, streaming telemetry, etc.).

In one example, the collector 116 stores production events in one or more partitions or virtual groups referred to herein as "topics," where a topic carries a specific type of event (e.g., a simple network management protocol event, a system logging protocol event, a polling event, or the like, which may be further partitioned into sub-topics). The use of topics allows the collector 116 to store the production events in an ordered fashion (e.g., the collector 116 may append production events one after another and create a log file).

The use of topics may also facilitate handling of the production events by one or more downstream devices or systems (e.g., components of the AS 104). It should be noted that multiple different collectors may be deployed to collect different types of events (e.g., SNMP, syslog, polling, streaming telemetry, etc.). Thus, in one example, the collector 116 may represent multiple collectors.

In one example, the replay dispatcher 118 may duplicate production events collected by the collector 116 to produce replay events. As discussed above, a "replay event," as understood within the context of the present disclosure, comprises a duplicate of a production event that additionally includes some metadata (e.g., a header or a flag set in a field of the header) to indicate that it is a replay event rather than a newly detected production event.

In one example, the collector 116 may forward production events to the AS 104 to be inserted into a stream of production events 132. The stream of production events 132 may comprise production events collected by the collector 116 for processing by the AS 104 (e.g., by various components of the AS 104 which may provide ticketing-related functions). Alternatively, the replay dispatcher 118 may forward replay events to the AS 104 in a dedicated stream of replay events 134. The stream of replay events 134 may exclusively comprise replay events generated by the replay dispatcher 118.

In accordance with the present disclosure, the AS 104 and DB 106 may be configured to provide one or more operations or functions in connection with examples of the present disclosure for inserting replay events into production flows. For instance, the AS 104 may comprise a plurality of components that provide ticketing-related functions for the production events and the replay events.

Figure 6:
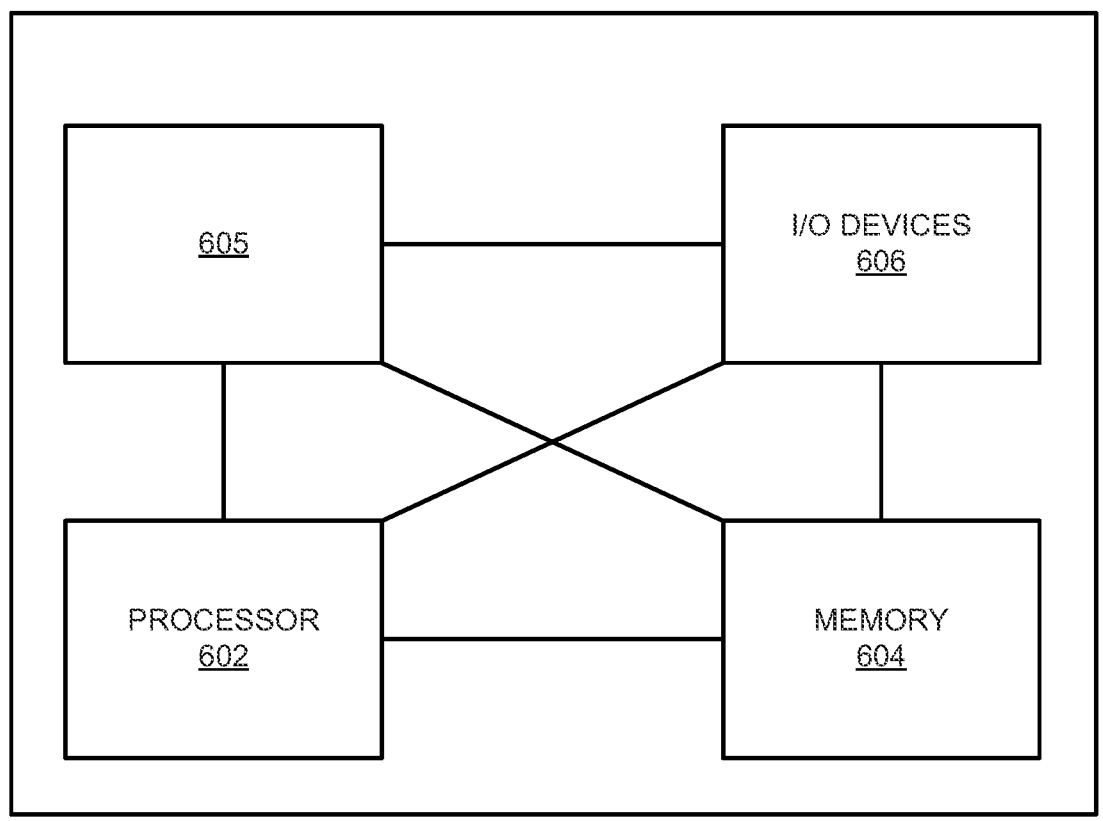
FIG. 6 depicts a high-level block diagram of a computing device or processing system specifically programmed to perform the functions described herein.

To this end, the AS 104 may comprise one or more physical devices, e.g., one or more computing systems or servers, such as computing system 600 depicted in FIG. 6, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure.

Figure 2:
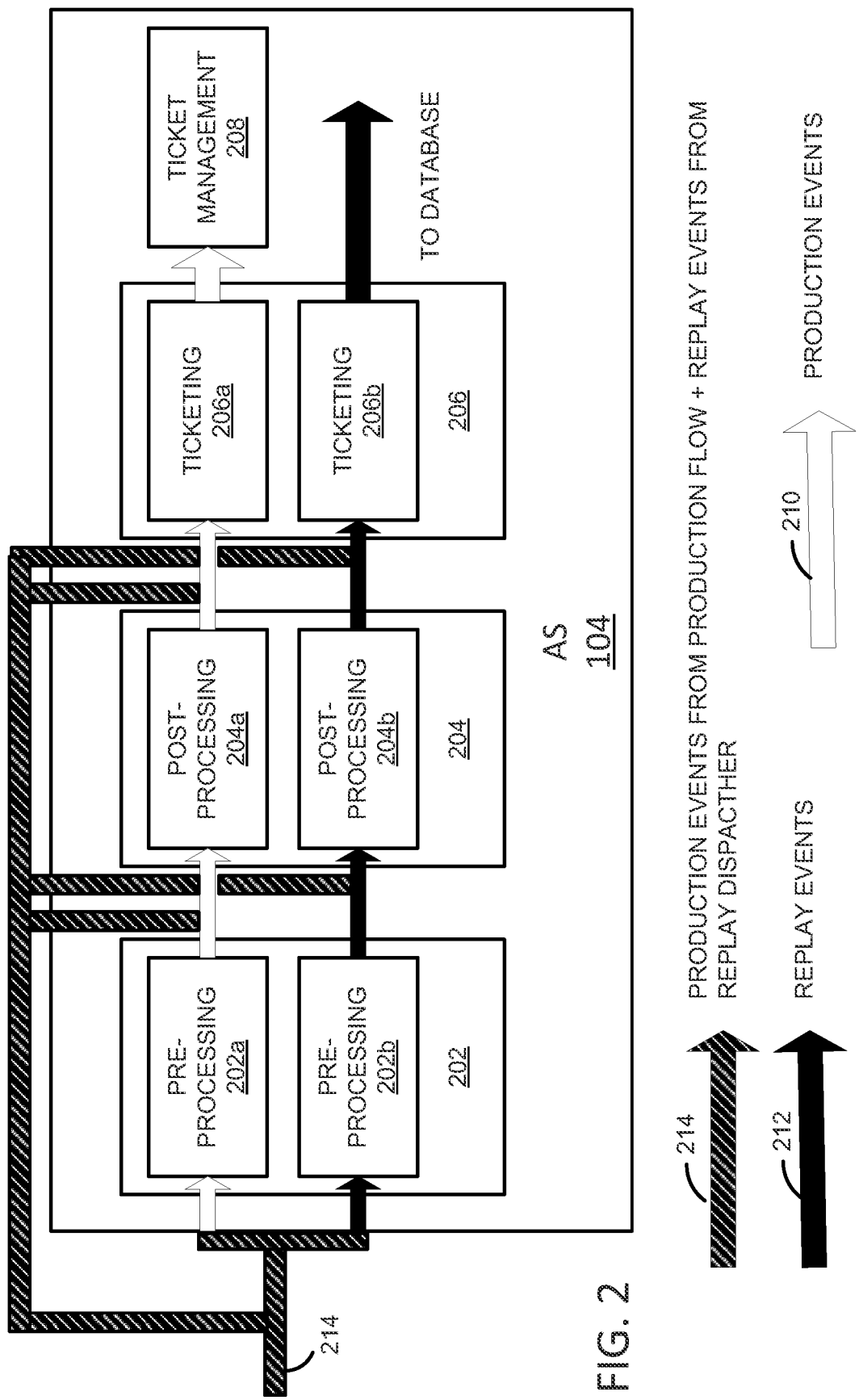
FIG. 2 illustrates one particular example of the application server of FIG. 1 in further detail.

One particular example of the AS 104 of FIG. 1 is illustrated in further detail in FIG. 2. As illustrated in FIG. 2, the AS 104 may comprise a plurality of components, including a pre-processing component 202, a post-processing component 204, a ticketing component 206 (which performs ticket creation from post-processed alarm events and ticket correlation), and a ticket management component 208 (which performs ticket enrichment, ticket storage, ticket graphical user interface (GUI) functions, and the like). Each of the pre-processing component 202, the post-processing component 204, and the ticketing component 206 may comprise at least two sub-components for processing different event flows. For instance, the pre-processing component 202 may comprise pre-processing component 202a and pre-processing component 202b; the post-processing component 204 may comprise post-processing component 204a and post-processing component 204b; and the ticketing component 206 may comprise ticketing component 206a and ticketing component 206b.

The pre-processing component 202a, post-processing component 204a, ticketing component 206a, and ticket management component 208 may comprise a first processing path 210 for processing production events, while the pre-processing component 202b, post-processing component 204b, ticketing component 206b, may comprise a second processing path 212 for processing replay events. In one example, components along the first processing path 210 are not configured to process replay events. As discussed above, components may detect when an event is a replay event by analyzing the flow type identifier in the metadata of the replay event.

Each of the components, i.e., pre-processing component 202a, pre-processing component 202b, post-processing component 204a, post-processing component 204b, ticketing component 206a, ticketing component 206b, and ticket management component 208 may subscribe to one or more topics, where the topics are used as described above to group events. By subscribing to specific topics, the components may control the types of events that the components receive and process.

In one example, replay events (either in the stream of replay events 134 or inserted into the stream of production events 132) may be delivered directly to the pre-processing component 202b. FIG. 2 illustrates an example in which the replay events are inserted into the stream of production events 132 to produce a production flow combined with inserted replay events, indicated by arrow 214. As illustrated, events in the production flow combined with inserted replay events 214 may be directed to the appropriate processing path (e.g., first processing path 210 or second processing path 212) when the production flow combined with inserted replay events 214 reaches the pre-processing component 202. However, if the replay events are part of a dedicated replay stream (rather than being inserted into the production stream), the operations performed by the components of the second processing path 212 on the replay events would be the same.

Thus, the pre-processing component 202b may perform one or more pre-processing operations on the replay events. These pre-processing operations may reformat the replay events so that the replay events can be read by a human technician. For instance, as discussed above, production events (and the replay events that are generated by duplicating the production events) may be generated in a machine-readable form that can be understood by a computer, but not by a human technician. Thus, reformatting of the replay events may be needed to facilitate analysis by a human technician. In one example the pre-processing operations performed by the pre-processing component 202b may include virtual network function event stream (VES) normalization.

Once pre-processing has been performed by the pre-processing component 202b, the replay events may pass along the second processing path 212 to the post-processing component 204b. The post-processing component 204b may perform one or more post-processing operations on the replay events, such as alarm processing rules including smoothing (also referred to as aging), de-duplication, suppression, chronic/flapping, alarm correlation, and the like. These post-processing operations may create, for each reformatted replay event on the second processing path 212, an alarm based on the reformatted replay event. The alarm may comprise a notification to alert a human technician to the occurrence of the replay event. The post-processing component 204b may correlate alarms that are redundant or that are related to the same root cause. For instance, an alarm relating to a failed router and an alarm relating to a failed port of the router may be correlated, as failure of the port is likely to be caused by failure of the router (and, hence, restoring the router will likely restore the port).

Once post-processing has been performed by the post-processing component 204b, the second processing path 212 may pass the alarmed replay events to the ticketing component 206b. The ticketing component 206b may create, for each alarmed replay event on the second processing path 212, a ticket. The ticket may comprise a tracking tool that contains information about the alarmed replay event. The ticket may be used, for example, to prioritize alarmed replay events, organize alarmed replay events into a queue, correlate alarmed replay events, and the like. The ticketing component 206b may also correlate tickets which are redundant or tickets which originate from two or more independent domains (e.g., a 5G fault that is caused by a wireline fault alarm). Correlation of tickets ensures that the limited resources of the human technicians are deployed in the most optimal manner (e.g., the technicians do not waste time trying to resolve redundant tickets when other, potentially more pressing tickets may be queued).

Once the replay events have been reformatted, alarmed, and ticketed, the second processing path 212 may output the tickets to a database (e.g., DB 106 of FIG. 1). It should be noted that in one example, the pre-processing component 202b, and/or the post-processing component 204b may preserve the metadata (e.g., headers) of the replay events until tickets for the replay events are generated by the ticketing component 206b and then forwarded to the ticket management component 208 (which may perform operations including ticket enrichment, ticket storage, ticket GUI operations, and the like).

Operations performed on the production events in the first processing path 210 are similar to those described above. For instance, the pre-processing component 204a may perform one or more pre-processing operations on the production events in the first processing path 210. These pre-processing operations may reformat the production events as discussed above so that the production events can be read by a human technician.

Once pre-processing has been performed by the pre-processing component 202a, the first processing path 210 may pass the production events to the post-processing component 204a. The post-processing component 204a may create, for each reformatted production event in the first processing path 210, an alarm based on the reformatted production event as described above. The post-processing component 204a may also correlate alarms.

Once post-processing has been performed by the post-processing component 204a, the first processing path 210 may pass the production events to the ticketing component 206a. The ticketing component 206a may create, for each alarmed production event in the first processing path 210, a ticket as described above. The ticketing component 206a may also perform ticket correlation as described above.

Once the production events have been reformatted, alarmed, and ticketed, the production flow on the first processing path 210 may deliver the production events to the ticket management component 208.

As illustrated in FIG. 2, the production flow combined with inserted replay events 214 may be inserted into the first processing path 210 and/or the second processing path 212 at multiple points. For instance, the production flow combined with inserted replay events 214 may be inserted directly before the pre-processing component 202, directly before the post-processing component 204, or directly before the ticketing component 206. Thus, replaying of replay events may skip one or more components of the AS 104. Thus, replay events may be inserted anywhere in the end-to-end flow, in which case the replay events may mimic the output of earlier components in the first processing path 210 or the second processing path 212.

Referring back to FIG. 1, the DB 106, as described above, may store tickets associated with processed events of the first processing path 210 and/or the second processing path 212. In one example, DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for processing replay events detected in production flows, as described herein. An example method for processing replay events that have been inserted into production flows is described in greater detail below in connection with FIG. 5.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 3:
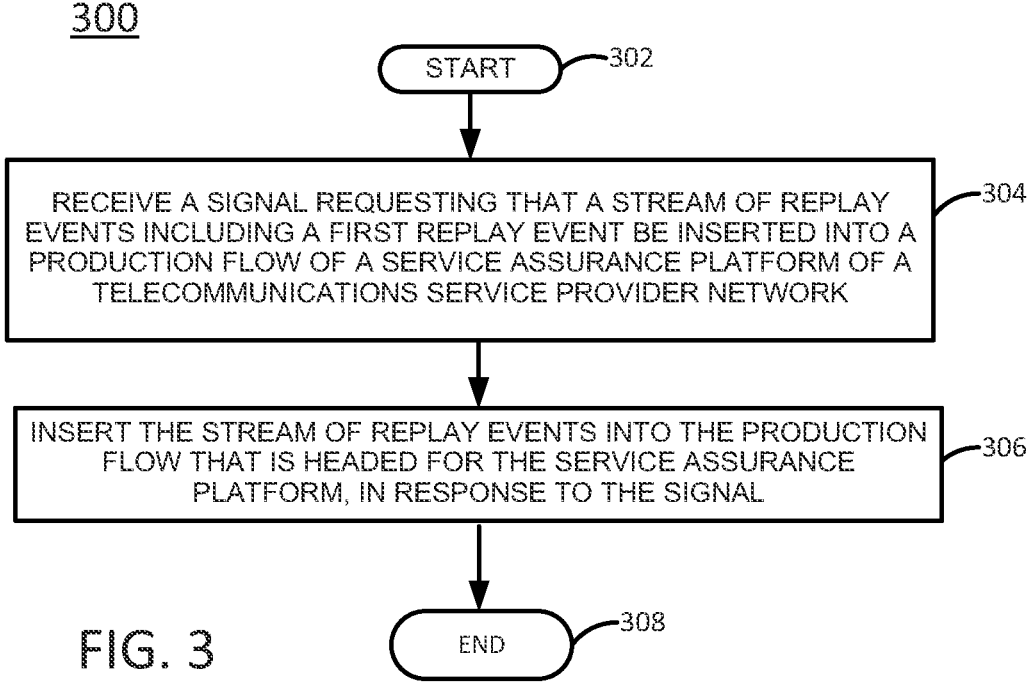
FIG. 3 illustrates a flowchart of an example method for inserting replay events into production flows, in accordance with the present disclosure.

FIG. 3 illustrates a flowchart of an example method 300 for inserting replay events into production flows, in accordance with the present disclosure. In one example, steps, functions and/or operations of the method 300 may be performed by a device as illustrated in FIG. 1, e.g., replay dispatcher (e.g., a replay dispatcher 118 of FIG. 1). In one example, the steps, functions, or operations of method 300 may be performed by a computing device or system 600, and/or a processing system 602 as described in connection with FIG. 6 below. For instance, the computing device 600 may represent at least a portion of the replay dispatcher 118 in accordance with the present disclosure. For illustrative purposes, the method 300 is described in greater detail below in connection with an example performed by a processing system, such as processing system 602.

The method 300 begins in step 302 and proceeds to step 304. In step 304, the processing system may receive a signal requesting that a stream of replay events including a first replay event be inserted into a production flow of a service assurance platform of a telecommunications service provider network. As discussed above, in one example, the production flow comprises a stream of production events, i.e., real-time original (i.e., not replay) events observed by devices within the telecommunications service provider network and collected at a collection point (e.g., such as collector 116 of FIG. 1). The stream of replay events, on the other hand, contains duplicates of historical (or previously observed) production events, which are referred to as "replay events," and which are to be replayed into the service assurance system (either in the production flow according to the request received in step 304 or in a separate, dedicated replay flow). The signal may be received in the form of a command line, by a user selection via a graphical user interface (GUI), or by other means.

The processing system may annotate the replay events with metadata to identify the events as replay events rather than production events, which facilitates proper downstream handling by components of the service assurance platform. In one example, the metadata may include at least an identifier that uniquely identifies the replay event and a timestamp that identifies a time at which the replay event was originally observed to occur as a production event. The metadata may also include a flow type identifier that identifies the flow type of the replay event (e.g., as either a production flow or a replay flow).

The metadata may be contained in a dedicated header to indicate that the replay event is a replay event (e.g., coming from a replay dispatcher rather than a collector). The use of a dedicated header may facilitate the reuse of existing collector (e.g., production) topics, e.g., so that new replay topics do not need to be created for each replay flow to be replayed into the service assurance system. The ability to reuse existing production topics for replay events, rather than create new replay topics for the replay events, may simplify maintenance operations by reducing the total number of topics to be managed by the service assurance system.

In another example, the metadata may include a flag set in a conventional header to indicate that the replay event is a replay event (e.g., setting a value of the header to zero (0) may indicate a production event, while setting the value to one (1) may indicate a replay event).

In step 306, the processing system may insert the stream of replay events into the production flow that is headed for the service assurance platform, in response to the signal. In one example, the replay events in the stream of replay events maintain the metadata that identifies the events as replay events when the replay events are inserted into the production flow. The stream of replay events may be inserted into the production flow at any one of multiple points in the production flow (e.g., directly before any of the pre-processing component 202, post-processing component 204, and ticketing component 206 described above).

The method 300 may end in step 308.

Figure 4:
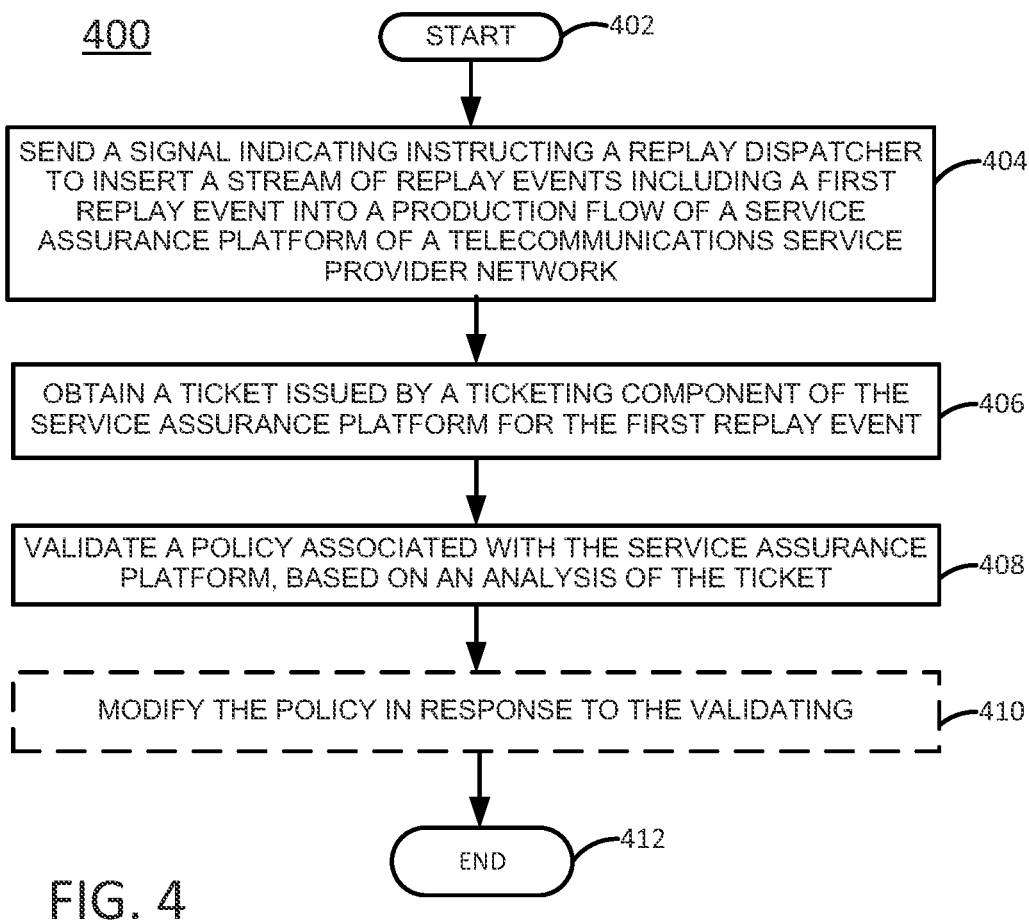
FIG. 4 illustrates a flowchart of an example method for inserting replay events into production flows, in accordance with the present disclosure.

FIG. 4 illustrates a flowchart of an example method 400 for inserting replay events into production flows, in accordance with the present disclosure. In one example, steps, functions and/or operations of the method 400 may be performed by a device as illustrated in FIG. 1, e.g., a control device (e.g., a user endpoint device operated by a human technician, such as one of the user endpoint devices 108, 110, 112, and 114 of FIG. 1, or by a replay dispatcher such as replay dispatcher 118 of FIG. 1 which may include a GUI). In one example, the steps, functions, or operations of method 400 may be performed by a computing device or system 600, and/or a processing system 602 as described in connection with FIG. 6 below. For instance, the computing device 600 may represent at least a portion of the user endpoint device 108, 110, 112, or 114 in accordance with the present disclosure. For illustrative purposes, the method 400 is described in greater detail below in connection with an example performed by a processing system, such as processing system 602.

The method 400 begins in step 402 and proceeds to step 404. In step 404, the processing system may send a signal indicating instructing a replay dispatcher to insert a stream of replay events including a first replay event into a production flow of a service assurance platform of a telecommunications service provider network. As discussed above, in one example, the production flow comprises a stream of production events, i.e., real-time original (i.e., not replay) events observed by devices within the telecommunications service provider network and collected at a collection point (e.g., such as collector 116 of FIG. 1). The replay stream, on the other hand, comprises duplicates of historical (or previously observed) production events, which are referred to as "replay events," and which are to be replayed into the service assurance system (e.g., either in the production flow in accordance with the request sent in step 404 or in a separate, dedicated replay flow).

The replay events may include metadata to identify the events as replay events rather than production events. In one example, the metadata may include at least an identifier that uniquely identifies the replay event and a timestamp that identifies a time at which the replay event was originally observed to occur as a production event. The metadata may also include a flow type identifier that identifies the flow type of the replay event (e.g., as either a production flow or a replay flow).

The metadata may be contained in a dedicated header to indicate that the replay event is a replay event (e.g., coming from a replay dispatcher rather than a collector). The use of a dedicated header may facilitate the reuse of existing collector (e.g., production) topics, e.g., so that new replay topics do not need to be created for each replay event to be replayed into the service assurance system. The ability to reuse existing production topics for replay events, rather than create new replay topics for the replay events, may simplify maintenance operations by reducing the total number of topics to be managed by the service assurance system.

In another example, the metadata may include a flag set in a conventional header to indicate that the replay event is a replay event (e.g., setting a value of the header to zero (0) may indicate a production event, while setting the value to one (1) may indicate a replay event).

The signal may additionally indicate where in the production flow to insert the replay stream. As discussed above, replay events may be inserted into the production flow at any one of multiple points in the production flow (e.g., directly before any of the pre-processing component 202, post-processing component 204, and ticketing component 206 described above).

In one example, the signal may be sent via a command line or via a selection of the production flow in a drop-down menu of a graphical user interface. For instance, the processing system may present the drop-down menu on a display to the human technician, where the drop-down menu allows the human technician to select a destination for the stream of replay events. In one example, the possible destinations presented by the GUI for selection include the production flow and a replay flow. In one example, the replay flow, as opposed to the production flow, contains no production events. In other words, the replay flow may exclusively contain replay events to be replayed into the service assurance system. In one example, the metadata of a replay event may further include metadata identifying the flow into which the replay event is to be inserted (e.g., production flow or replay flow), as discussed above.

In step 406, the processing system may obtain a ticket issued by a ticketing component of the service assurance platform for the first replay event. The ticket may include the header of the first replay event, which may allow the processing system to identify the ticket as corresponding to the first replay event. In one example, the ticket may be retrieved from a database that stores a plurality of tickets for a plurality of replay events (e.g., such as DB 106 of FIG. 1).

In step 408, the processing system may validate a policy associated with the service assurance platform, based on an analysis of the ticket. For instance, analysis of the ticket may help the processing system to determine whether a particular policy (e.g., a policy designed to pinpoint, diagnose and/or a resolve service quality degradation or device malfunction in the telecommunication service provider network) is effective.

In optional step 410, the processing system may modify the policy in response to the validating. For instance, the validation may determine that the policy is not effective, or does not achieve at least some threshold rate of efficacy. When the policy is not effective, the processing system may receive a signal from a human technician or policy writer to make one or more modifications to the policy, where the modifications are designed to improve the efficacy of the policy. The policy, as modified, may then be tested and validated according to steps 404-410 as described above (e.g., by inserting replay events into the production flow and analyzing the tickets resulting from replay of the replay events).

The method 400 may end in step 412.

Figure 5:
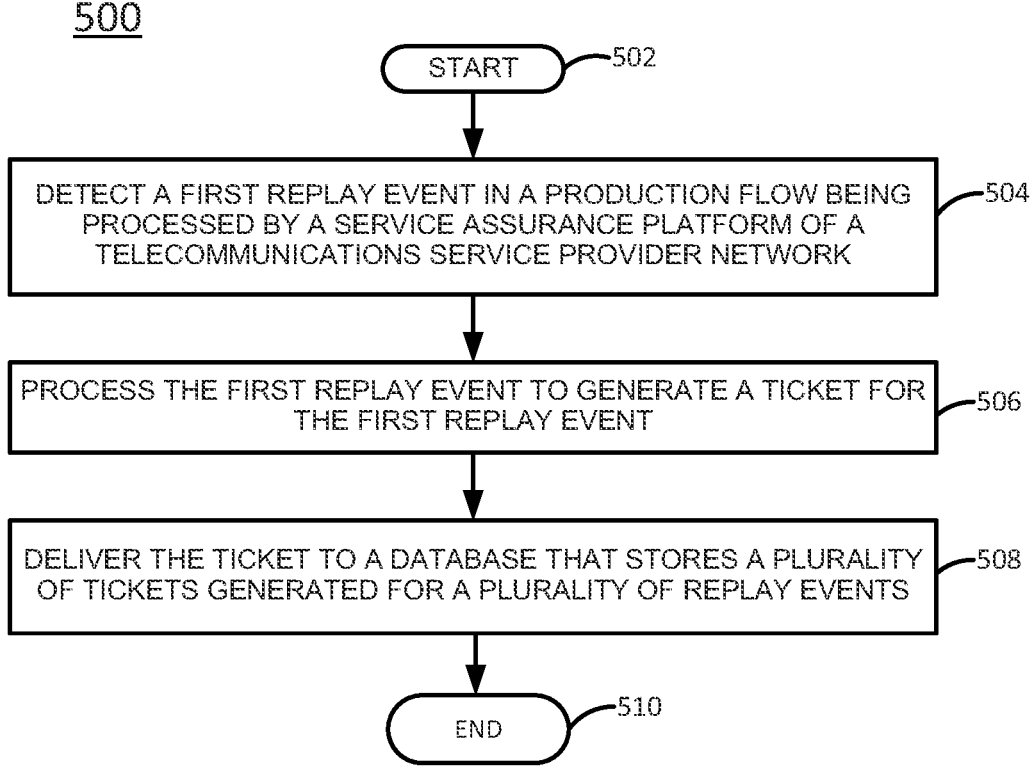
FIG. 5 illustrates a flowchart of an example method for processing replay events that have been inserted into production flows, in accordance with the present disclosure.

FIG. 5 illustrates a flowchart of an example method 500 for processing replay events that have been inserted into production flows, in accordance with the present disclosure. In one example, steps, functions and/or operations of the method 500 may be performed by a device as illustrated in FIG. 1, e.g., a ticketing component of a ticketing system (e.g., ticketing component 206 of FIG. 2, and more particularly by ticketing component 206*b*). In one example, the steps, functions, or operations of method 500 may be performed by a computing device or system 600, and/or a processing system 602 as described in connection with FIG. 6 below. For instance, the computing device 600 may represent at least a portion of the ticketing component 206 in accordance with the present disclosure. For illustrative purposes, the method 500 is described in greater detail below in connection with an example performed by a processing system, such as processing system 602.

The method 500 begins in step 502 and proceeds to step 504. In step 504, the processing system may detect a first replay event in a production flow being processed by a service assurance platform of a telecommunications service provider network, where the production flow comprises a stream of production events (e.g., collected by a collector such as collector 116 of FIG. 1) and a stream of replay events including at least the first replay event (e.g., inserted into the production flow by a replay dispatcher, such as replay dispatcher 118 of FIG. 1).

In one example, the processing system may detect the first replay event by detecting metadata associated with the first replay event that identifies the first replay event as a replay event rather than a production event. For instance, the first replay event may include a dedicated header as described above. The header may include, for example, an identifier that uniquely identifies the replay event, a timestamp that identifies a time at which the replay event was originally observed to occur as a production event, and/or a flow type identifier identifying the type of flow (e.g., production or replay). Production events may not include this header.

In one example, the first replay event may be associated with an alarm. For instance, the first replay event may have been received directly from an alarm component of the service assurance platform.

In step 506, the processing system may process the first replay event to generate a ticket for the first replay event. As discussed above, the ticket may comprise a tracking tool that contains information about the first replay event. The ticket may be used, for example, to prioritize alarmed replay events, organize alarmed replay events into a queue, correlate alarmed replay events, and the like.

In step 508, the processing system may deliver the ticket to a database that stores a plurality of tickets generated for a plurality of replay events. The database may be accessible by a human technician or a policy writer for the service assurance platform. The policy writer may review the ticket in order to determine whether the ticket indicates a need to modify one or more policies associated with the service assurance platform, where the policies may be designed to pinpoint, diagnose and/or resolve service quality degradations or device malfunctions in the telecommunication service provider network.

The method 500 may end in step 510.

It should be noted that the methods 300, 400, and 500 may be expanded to include additional steps or may be modified to include additional operations with respect to the steps outlined above. In addition, although not specifically specified, one or more steps, functions, or operations of the methods 300, 400, and 500 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 3, FIG. 4, or FIG. 5 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 6 depicts a high-level block diagram of a computing device or processing system specifically programmed to perform the functions described herein. As depicted in FIG. 6, the processing system 600 comprises one or more hardware processor elements 602 (e.g., a central processing unit (CPU), a microprocessor, or a multi-core processor), a memory 604 (e.g., random access memory (RAM) and/or read only memory (ROM)), a module 605 for inserting replay events into production flows, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300, 400, or 500 as discussed above is implemented in a distributed or parallel manner for a particular illustrative example, i.e., the steps of the above method 300, 400, or 500, or the entire method 300, 400, or 500, is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 602 can also be configured or programmed to cause other devices to perform one or more operations as discussed above. In other words, the hardware processor 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300, 400, or 500. In one example, instructions and data for the present module or process 605 for inserting replay events into production flows (e.g., a software program comprising computer-executable instructions) can be loaded into memory 604 and executed by hardware processor element 602 to implement the steps, functions, or operations as discussed above in connection with the illustrative method 300, 400, or 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 605 for inserting replay events into production flows (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    detecting, by a processing system including at least one processor, a first replay event in a production flow being processed by a service assurance platform of a telecommunications service provider network, where the production flow comprises a real time stream of new production events and a stream of replay events including at least the first replay event, and wherein each replay event in the stream of replay events comprises an event that was observed in the production flow in the past and that has been duplicated and associated with metadata prior to the each replay event being inserted into the real time stream of new production events to produce the production flow;
    processing, by the processing system, the first replay event to generate a ticket for the first replay event; and
    delivering, by the processing system, the ticket to a database that stores a plurality of tickets generated for a plurality of replay events.

2. The method of claim 1, wherein production events of the real time stream of new production events are collected by a collector of the service assurance platform.

3. The method of claim 2, wherein at least some of the production events are duplicated by a replay dispatcher of the service assurance platform to produce a plurality of replay events of the stream of replay events.

4. The method of claim 3, wherein the stream of replay events is inserted into the real time stream of new production events by the replay dispatcher to produce the production flow.

5. The method of claim 3, wherein the replay dispatcher associates the metadata with each replay event of the plurality of replay events to distinguish the each replay event from the production events.

6. The method of claim 5, wherein the detecting comprises:
    determining, by the processing system, that the first replay event includes the metadata.

7. The method of claim 5, wherein the metadata is contained in a header, and wherein the production events do not include the header.

8. The method of claim 7, wherein the metadata includes at least one of: a unique identifier that identifies a specific job associated with the first replay event, a time stamp indicating a time at which a production event of which the first replay event is a duplicate was observed in the production flow, or a flow indicator identifying the first replay event as belonging to the real time stream of new production events or the stream of replay events.

9. The method of claim 6, wherein the production flow is obtained by the processing system from a post-processing component of the service assurance platform that has generated an alarm for the first replay event.

10. The method of claim 9, wherein the first replay event has been processed by a pre-processing component of the service assurance system, prior to arriving at the post-processing component, to be converted from a machine-readable form to a human-readable form.

11. The method of claim 10, wherein the metadata is preserved by the pre-processing system and the post-processing system prior to the detecting.

12. The method of claim 1, wherein the first replay event comprises a replay of at least one of: a simple network management protocol event, a system logging protocol event, a polling event, or a streaming telemetry event.

13. A non-transitory computer-readable medium storing instructions which, when executed by a processing system including at least one processor, cause the processing system to perform operations, the operations comprising:
    detecting a first replay event in a production flow being processed by a service assurance platform of a telecommunications service provider network, where the production flow comprises a real time stream of new production events and a stream of replay events including at least the first replay event, and wherein each replay event in the stream of replay events comprises an event that was observed in the production flow in the past and that has been duplicated and associated with metadata prior to the each replay event being inserted into the real time stream of new production events to produce the production flow;
    processing the first replay event to generate a ticket for the first replay event; and
    delivering the ticket to a database that stores a plurality of tickets generated for a plurality of replay events.

14. A system comprising:
    a processing system including at least one processor; and
    a non-transitory computer-readable medium storing instructions which, when executed by the processing system, cause the processing system to perform operations, the operations comprising:
        detecting a first replay event in a production flow being processed by a service assurance platform of a telecommunications service provider network, where the production flow comprises a real time stream of new production events and a stream of replay events including at least the first replay event, and wherein each replay event in the stream of replay events comprises an event that was observed in the production flow in the past and that has been duplicated and associated with metadata prior to the each replay event being inserted into the real time stream of new production events to produce the production flow;
        processing the first replay event to generate a ticket for the first replay event; and
        delivering the ticket to a database that stores a plurality of tickets generated for a plurality of replay events.

15. The system of claim 14, further comprising:
    a collector of the service assurance platform to collect production events of the real time stream of new production events; and
    a replay dispatcher to duplicate at least some of the production events to produce a plurality of replay events of the stream of replay events and to associate the metadata with each replay event of the plurality of replay events.

16. The system of claim 15, further comprising:
    a pre-processing component of the service assurance platform to convert the production events and the plurality of replay events from computer-readable form to human-readable form; and a post-processing component to generate one or more alarms for the production events and the plurality of replay events.

17. The system of claim 16, wherein the pre-processing component, the post-processing component, and a ticketing component of which the processing system is a part preserve the metadata.

18. The system of claim 15, wherein the metadata includes, for the first replay event, at least one of: a unique identifier that identifies a specific job associated with the first replay event, a time stamp indicating a time at which a production event of which the first replay event is a duplicate was observed in the production flow, or a flow indicator identifying the first replay event as belonging to the stream of production events or the stream of replay events.

19. The system of claim 14, further comprising:

a ticketing correlation component to correlate tickets generated for the production events.

20. The system of claim 14, wherein the first replay event comprises a replay of at least one of: a simple network management protocol event or a system logging protocol event.

* * * * *